(12) United States Patent
Westner

(10) Patent No.: US 7,992,943 B2
(45) Date of Patent: Aug. 9, 2011

(54) DUMP BODY

(75) Inventor: Harald Westner, Memmingen-Eisenburg (DE)

(73) Assignee: Liebherr-Hydraulikbagger GmbH, Kirchdorf/Iller (DE)

( * ) Notice: Subject to any disclaimer, the term of this patent is extended or adjusted under 35 U.S.C. 154(b) by 39 days.

(21) Appl. No.: 12/357,326

(22) Filed: Jan. 21, 2009

(65) Prior Publication Data
US 2009/0127887 A1    May 21, 2009

Related U.S. Application Data

(62) Division of application No. 11/369,890, filed on Mar. 6, 2006, now abandoned.

(51) Int. Cl.
*B60P 1/16* (2006.01)
(52) U.S. Cl. .................................................. 298/22 P
(58) Field of Classification Search ............... 296/183.1, 296/183.2; 298/22 P
See application file for complete search history.

(56) References Cited

U.S. PATENT DOCUMENTS

| | | | |
|---|---|---|---|
| 1,883,936 A * | 10/1932 | Kerr | 296/183.2 |
| 2,490,532 A | 12/1949 | Maxon | |
| 2,674,489 A * | 4/1954 | Maxon, Jr. | 298/17 R |
| 3,093,254 A * | 6/1963 | Sammarco | 414/526 |
| 5,090,773 A | 2/1992 | Guillaume | |
| 5,454,620 A | 10/1995 | Hill et al. | |
| 5,482,356 A * | 1/1996 | Goodson, Jr. | 298/22 AE |
| 5,551,759 A * | 9/1996 | Hoss et al. | 298/22 P |
| 5,597,211 A | 1/1997 | Golden | |
| 6,637,808 B1 | 10/2003 | Ling et al. | |
| 6,641,223 B2 * | 11/2003 | Kingston | 298/22 P |
| 6,688,673 B2 * | 2/2004 | Kloepfer | 296/181.1 |
| 6,854,789 B2 * | 2/2005 | Kloepfer | 296/183.2 |
| 6,854,808 B2 | 2/2005 | Kostecki | |
| 2007/0145809 A1 * | 6/2007 | Timoney et al. | 298/22 P |

FOREIGN PATENT DOCUMENTS

DE    10240799    2/2004

* cited by examiner

*Primary Examiner* — Hilary Gutman
(74) *Attorney, Agent, or Firm* — Alleman Hall McCoy Russell & Tuttle LLP

(57) ABSTRACT

A dump body for a transport vehicle, in particular for the transportation of bulk material, is described. The dump body can be pivoted around a pivot axis between a support position and an upwardly pivoted ejection position by means of a drive device and consists of a body preferably made of sheet metal and having a base, side walls, a front wall terminating the dump body at one end and a chute arranged at the oppositely disposed end and drawn upwardly with respect to the base, wherein the body is rounded in a parabolic manner, with it having a rounded body base, a rounded chute and a rounded transition between the body base and the chute.

4 Claims, 3 Drawing Sheets

DUMP BODY

CROSS REFERENCE TO RELATED APPLICATIONS

This is a divisional application of U.S. patent application Ser. No. 11/369,890 filed Mar. 6, 2006, which in turn claims priority to German Patent Application Ser. No. 20 2005 003 821.0 filed Mar. 9, 2005, both of which are hereby incorporated by reference in their entirety for all purposes.

FIELD

The present disclosure relates to a dump body for a transport vehicle, in particular for the transportation of bulk material.

BACKGROUND AND SUMMARY

The transportation of bulk material typically takes place in dump bodies of off-road haulers having an upwardly open cross-section, said dump bodies being semi-circular or rectangular and having right-angle or rounded inner corners.

Dump bodies typically have a flat base and two side walls parallel to the longitudinal axis of the dump bodies, said side walls converging at a right angle or with rounded inner corners. A further wall, which is arranged at the front part transversely to the longitudinal axis of the dump body, terminates the latter at its front end and forms a front wall. At the oppositely disposed side in some designs, a flap is hingedly connected in the upper region of the dump body and permits an unloading of the bulk material on a corresponding opening. A so-called chute can also be provided instead of a flap which extends away upwardly starting from the base and thus prevents an unintentional falling out of the bulk material during the journey.

To ensure a sufficient stiffness and strength during loading, transportation and unloading, the outer wall of the dump body is typically reinforced with the help of a group of side members and cross members. These external reinforcements, which are generally welded to the body of the dump body, substantially increase the weight and manufacturing costs.

It is the object of the present disclosure to further develop generic dump bodies such that they have a considerably reduced weight of their own while maintaining the required strength.

This object is solved in accordance with a dump body for a transport vehicle, in particular for the transportation of bulk material, which is pivotable around a pivot axis between a support position and an upwardly pivoted ejection position by a drive device and which comprises a body preferably made of sheet metal and having a base, side walls, a front wall terminating the dump body at one end and a chute arranged at the oppositely disposed end and drawn upwardly with respect to the base, where the body is rounded in a parabolic manner with it having a rounded body base, a rounded chute and a rounded transition between the body base and the chute.

Due to the parabolic body shape, the side members and the cross members such as are used in conventional dumper bodies can be omitted. The body's own weight is hereby decisively reduced, whereby the payload of the dumper vehicles can be increased.

The parabolic body shape represents an optimum shape for a harmonious distribution of strains in the body base, in the chute and in the side walls in each of the possible load states.

The dump body can be laterally widened at its upper edge in the region of the side walls. The strength of the dump body is hereby increased overall, on the one hand. This widened edge also facilitates the filling of the dump body using a corresponding loader, excavator or other transfer apparatus, on the other hand.

The parabolically rounded body is particularly advantageously manufactured from rolled sheet metal panels or multi-bent metal sheets.

BRIEF DESCRIPTION OF THE FIGURES

Further features, details and advantages of the present disclosure result from an embodiment shown in the drawings. There are shown.

DETAILED DESCRIPTION

Figure 1:
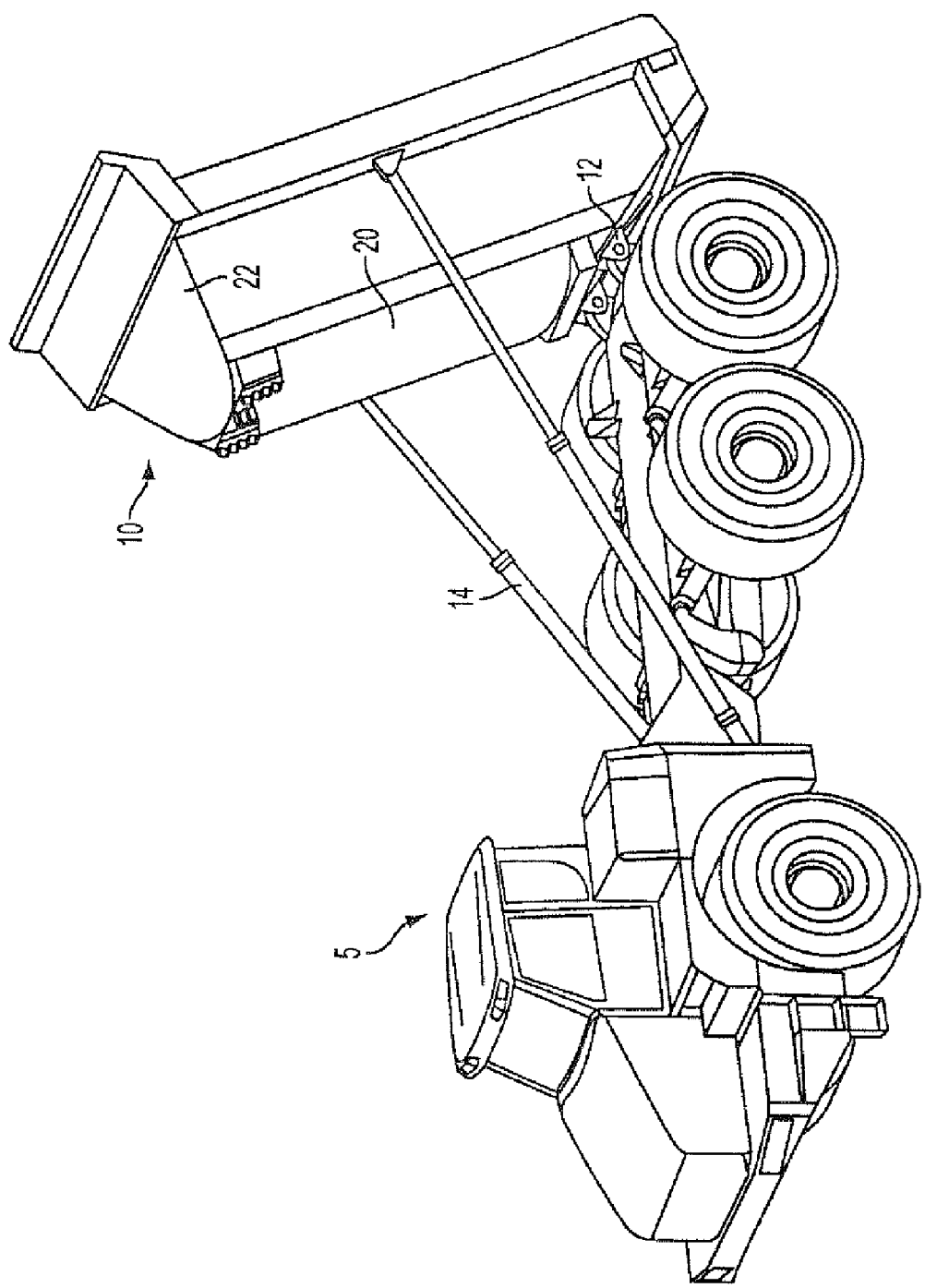
FIG. 1 is a representation of a transport vehicle of a dump body in accordance with an embodiment of the present disclosure in a tilted position.
Figure 2:
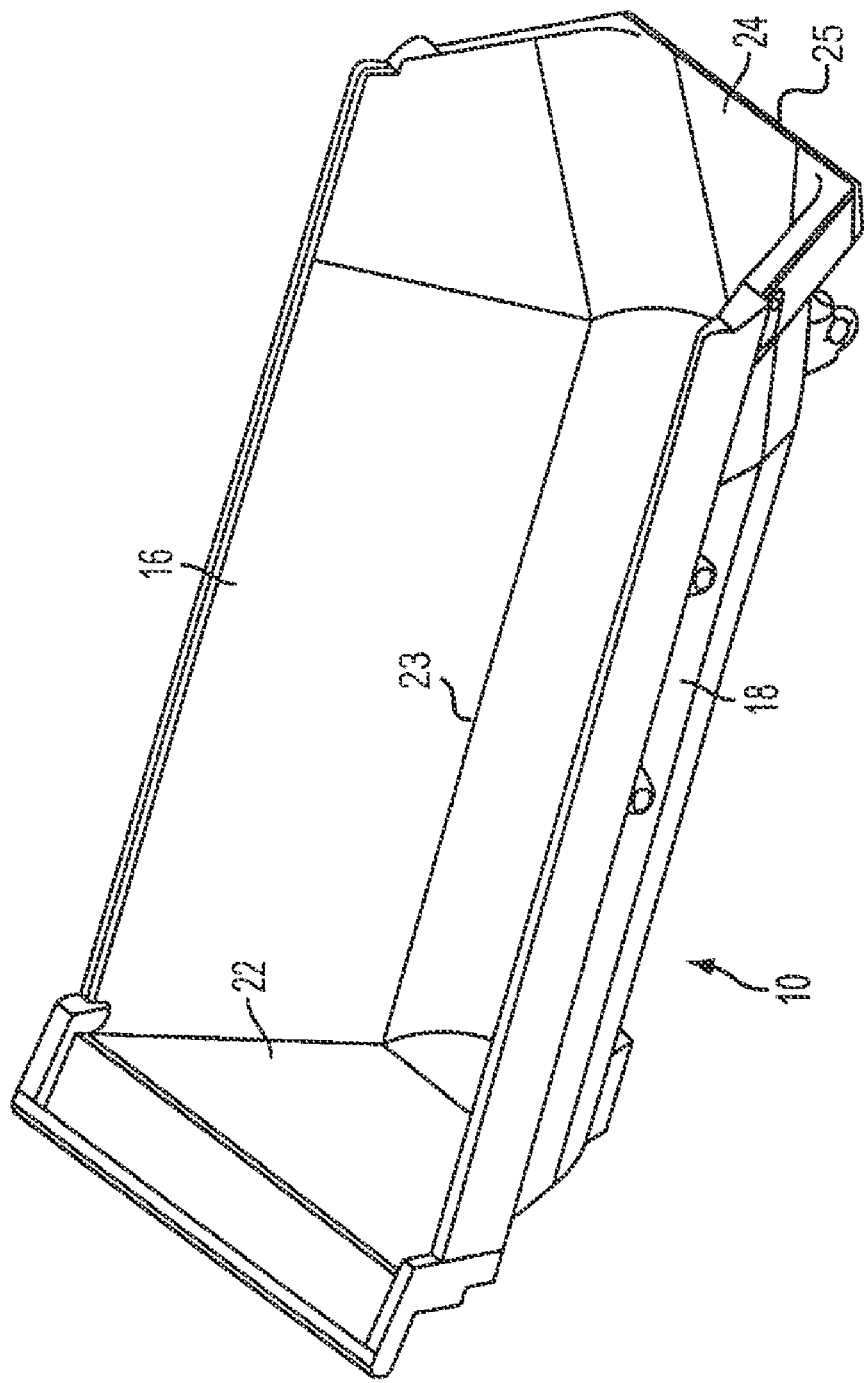
FIG. 2 is a perspective representation of the dump body in accordance with the present disclosure in accordance with FIG. 1 in a perspective representation from diagonally above.
Figure 3:
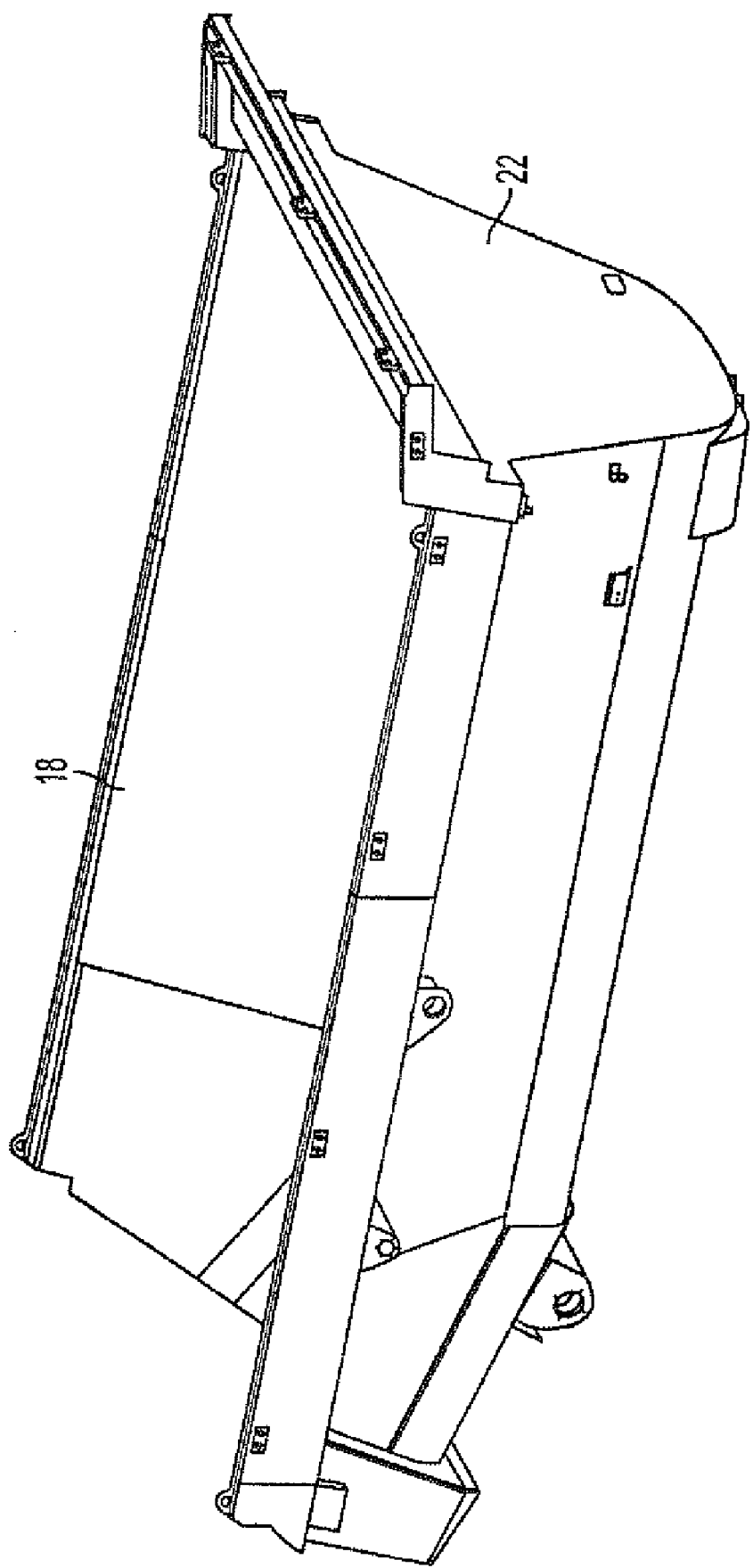
FIG. 3 is another perspective representation of the dump body from diagonally above.

A transport vehicle 5 is shown in FIG. 1 at whose bogie end a dump body 10 is pivotable around a pivot axis 12. Piston-in-cylinder assemblies 14, which are hinged to the transport vehicle 5 at one end and to the dump body 10 at the other end, serve as drive devices for this purpose. The dump body includes a sheet metal construction having two side walls 16 and 18, a base 20, a front wall 22 which terminates the dump body 10 at one end and a chute 24 which is arranged at the oppositely disposed end of the front wall 22 and which extends diagonally upwardly with respect to the base 20 and thus prevents an unwanted falling out of the bulk material from the body. As can be seen from FIG. 1 and also from FIGS. 2 and 3, the body is of a parabolically rounded shape overall, with it having a rounded base 20, a rounded chute 24, a rounded transition between the rounded base 20 and the rounded chute 24, and a non-rounded chute exit base 25. Further, only one transition 23 is provided between the rounded base and each of the sidewalls 16 and 18.

Due to its shape, the parabolic body has an improved behavior with respect to denting. The bulk material slides at a shallow angle over the side walls of the body during loading. The denting of the body in the region of the side walls and of the base is thus reduced both during transport and during loading with rock stones, construction waste or the like. An unwanted adhering of the transport material can now be prevented due to a less strongly distorted or deformed metal sheet surface. The round body shape in addition prevents an adhering of the transport material in the corners of the bodies.

When tipping the bulk material out of the dump body, the standing security of the total transport vehicle is improved by a forced centering of the transport material. In this forced centering, the transport material slips down automatically to the center of the base due to the round shape. The dumping behavior of the bulk material is thus improved overall.

The invention claimed is:

1. A vehicle for transporting bulk material comprising:
   a dump body having a rounded base, two sidewalls, each of the two sidewalls having a straight interior surface that is flat, the sidewalls extending upward and outward from the rounded base to an upper edge region of the dump body at an angle that is acute to vertical, such that the dump body is laterally widened at the upper edge region of the sidewalls relative to the rounded base, and wherein only one side transition between the rounded base and each of the two sidewalls is provided, a front wall terminating the dump body at a front end of the rounded base, and a chute arranged at a rear end of the rounded base and being drawn diagonally upward with respect to the rounded base, wherein a rear transition between the rounded base and the chute is rounded, and wherein the rounded base of the dump body maintains its cross-sectional shape consistently from the front wall to the rear transition of the chute, and where an exit base of the chute is non-rounded; and two piston-in-cylinder assemblies extendable to drive the dump body between a support position and an upwardly pivoted ejection position, each of the two piston-in-cylinder assemblies having a first end attached to the vehicle and a second end attached to an upper exterior of the sidewalls of the dump body;

wherein the dump body is secured to the vehicle by at least the two piston-in-cylinder assemblies and a pivot positioned rearward of a rear axle of the vehicle, the pivot being positioned below and rearward of the rear transition between the rounded base and the chute of the dump body and ahead of a rear end of the dump body, wherein the dump body pivots between the support position and the upwardly pivoted ejection position and a pivot axis of the dump body is located at the pivot.

2. The vehicle of claim 1, wherein the dump body distributes strains in the base, the chute and the two side walls such that welded reinforcement members can be omitted.

3. The vehicle of claim 1, wherein the dump body distributes strains in the base, the chute and the two side walls such that side reinforcement members can be omitted.

4. The vehicle of claim 1 wherein the dump body comprises a sheet metal construction.

* * * * *